United States Patent [19]

Tsutsui et al.

[11] Patent Number: 5,700,749
[45] Date of Patent: Dec. 23, 1997

[54] PROCESS FOR POLYMERIZING OLEFINS

[75] Inventors: Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 396,893

[22] Filed: Mar. 1, 1995

Related U.S. Application Data

[63] Continuation of Ser. No. 267,299, Jun. 29, 1994, abandoned, which is a continuation of Ser. No. 22,200, Feb. 25, 1993, abandoned, which is a division of Ser. No. 854,758, Mar. 20, 1992, abandoned, which is a continuation of Ser. No. 554,163, Jul. 19, 1990, abandoned, which is a continuation of Ser. No. 205,325, filed as PCT/JP87/00696, Sep. 24, 1987, abandoned.

[30] Foreign Application Priority Data

| Sep. 24, 1986 | [JP] | Japan | 61-223781 |
| Oct. 1, 1986 | [JP] | Japan | 61-231242 |
| Oct. 1, 1986 | [JP] | Japan | 61-231243 |
| Dec. 11, 1986 | [JP] | Japan | 61-293446 |

[51] Int. Cl.$^6$ .............................. C08F 4/642; C08F 10/00
[52] U.S. Cl. .................. 502/117; 502/103; 502/120; 526/129; 526/153; 526/151; 526/152; 526/282; 526/348; 526/348.4; 526/348.5; 526/351; 526/904; 526/943
[58] Field of Search ........................ 502/103, 117

[56] References Cited

U.S. PATENT DOCUMENTS

| 3,030,395 | 4/1962 | Giddings . | |
| 3,104,249 | 9/1963 | Clauss et al. | 526/160 |
| 3,242,099 | 3/1966 | Manyik et al. | 526/165 |
| 4,404,344 | 9/1983 | Sinn et al. . | |
| 4,530,914 | 7/1985 | Ewen et al. . | |
| 4,542,199 | 9/1985 | Kaminsky et al. . | |
| 4,552,859 | 11/1985 | Band et al. . | |
| 4,618,662 | 10/1986 | Nowlin . | |
| 4,701,432 | 10/1987 | Welborn, Jr. . | |
| 4,704,491 | 11/1987 | Tsutsui et al. . | |
| 4,752,597 | 6/1988 | Turner | 526/160 |
| 4,808,561 | 2/1989 | Welborn, Jr. . | |
| 4,897,455 | 1/1990 | Welborn | 526/160 |
| 4,952,540 | 8/1990 | Kioka et al. . | |

FOREIGN PATENT DOCUMENTS

| 220436 | 2/1959 | Australia . | |
| 129368 | 6/1983 | European Pat. Off. . | |
| 0232595 | 8/1987 | European Pat. Off. . | |
| 60-130604 | of 1985 | Japan . | |
| 60-260602 | 12/1985 | Japan . | |
| 1314258 | 4/1973 | United Kingdom | 526/125 |

OTHER PUBLICATIONS

Translations of Japanese Kokai 60–260602 and 60–130604.

*Primary Examiner*—Edward J. Smith
*Attorney, Agent, or Firm*—Sherman and Shalloway

[57] ABSTRACT

This invention relates to a process for polymerizing olefins using a catalyst composed of a transition metal catalyst component, an aluminoxane component and an organoaluminum component. In the process of this invention, the catalyst exhibits excellent polymerization activity with the use of a small amount of the aluminoxane xane. The polymerization process gives olefin polymers having a narrow molecular weight distribution and by the copolymerization of two or more olefins, gives olefin copolymers having a narrow molecular weight distribution and a narrow composition distribution.

28 Claims, No Drawings

PROCESS FOR POLYMERIZING OLEFINS

This application is a continuation of application Ser. No. 08/267,299, filed Jun. 29, 1994; which is a continuation of application Serial No. 08/022,200, filed Feb. 25, 1993; which is a division of application Ser. No. 07/854,758, filed Mar. 20, 1992; which is a continuation of application Serial No. 07/554,163, filed July 19, 1990; which is a continuation of application Ser. No. 07/205,325, filed as PCT/JP87/00696, Sep. 24, 1987; all of which are now abandoned.

TECHNOLOGICAL FIELD

This invention relates to a process for polymerizing olefins. More specifically, it relates to a process for producing an olefin polymer of a narrow molecular Weight distribution by polymerizing an olefin with a catalyst showing excellent polymerization activity using a small amount of an aluminoxane, which when applied to the copolymerization of at least two olefins, can give a copolymer having a narrow molecular weight distribution and a narrow composition distribution.

BACKGROUND TECHNOLOGY

[Prior Art]

For the production of an alpha-olefin polymer, particularly an ethylene polymer or an ethylene/alpha-olefin copolymer, methods have previously been known in which ethylene is polymerized, or ethylene and an alpha-olefin are copolymerized, in the presence of a titanium-containing catalyst comprising a titanium compound and an organoaluminum compound or a vanadium-containing catalyst comprising a vanadium compound and an organoaluminum compound. Generally, ethylene/alpha-olefin copolymers obtained with titanium-type catalysts have a broad molecular weight distribution and a broad composition distribution and inferior transparency, surface non-adhesiveness, and mechanical properties. Ethylene/alpha-olefin copolymers obtained with vanadium-type catalysts have a narrower molecular weight distribution and a narrower composition distribution and are considerably improved in transparency, surface non-adhesiveness, and mechanical properties, but are still insufficient for uses which require these properties. Accordingly, alpha-olefin polymers, especially ethylene/alpha-olefin copolymers, improved in these properties are required.

On the other hand, catalysts comprising a zirconium compound and an aluminoxane have been proposed recently as a new type of Ziegler catalyst for olefin polymerization.

Japanese Laid-Open Patent Publication No. 198309/1983 discloses a process which comprises polymerizing ethylene and at least one alpha-olefin having 3 to 12 carbon atoms at a temperature of −50° C. to 200° C. in the presence of a catalyst composed of a transition metal-containing catalyst represented by the following formula (cyclopentadienyl)$_2$MeR$^1$Hal wherein R$^1$ represents cyclopentadienyl, C$_1$–C$_8$alkyl or halogen, Me represents a transition metal, and Hal represents halogen,
with a linear aluminoxane represented by the following formula Al$_2$OR$^2$$_4$(Al$^2$(R$^2$)—O)$_n$ wherein R$^2$ represents methyl or ethyl, and n is a number of 4 to 20, or a cyclic aluminoxane represented by the following formula

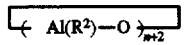

wherein R$^2$ and n are as defined above.

This patent document states that in order to adjust the density of the resulting polyethylene, ethylene should be polymerized in the presence of a small amount (up to 10% by weight) of a slightly long-chain alpha-olefin or a mixture thereof. Japanese Laid-Open Patent Publication No. 95292/1984 describes an invention relating to a process for producing a linear aluminoxane represented by the following formula

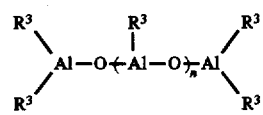

wherein n is 2 to 40 and R$^3$ is C$_1$–C$_8$ alkyl, and a cyclic aluminoxane represented by the following formula

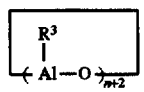

wherein n and R$^3$ are as defined above.

This Publication states that when an olefin is poly- merized using a mixture of methylaluminoxane produced by the above process with a bis(cyclopentadienyl) compound of titanium or zirconium, polyethylene is obtained in an amount of at least 25 million grams per gram of the transition metal per hour.

Japanese Laid-Open Patent Publication No. 35005/1985 discloses a process for producing a catalyst for polymerization of olefins, which comprises reacting an aluminoxane compound represented by the following formula

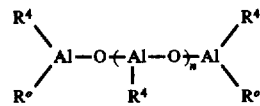

wherein R$^4$ represents C$_1$–C$_{10}$ alkyl, and R is R$^4$ or is bonded to represent —O—,
with a magnesium compound, then chlorinating the reaction product, and treating the chlorinated product with a compound of Ti, V, Zr or Cr. The above Publication describes that the above catalyst is especially suitable for the copolymerization of ethylene with a C$_3$–C$_{12}$ alpha-olefin mixture.

Japanese Laid-Open Patent Publication No. 35006/1985 discloses a combination of (a) a mono-, di- or tri-cyclopentadienyl compound of at least two different transition metals or its derivative with (b) alumoxane (aluminoxane) as a catalyst system for polymers blended in a reactor. Example 1 of this Publication discloses that polyethylene having a number average molecular weight of 15,300 and a weight average molecular weight of 36,400 and containing 3.4% of a propylene component was obtained by polymerizing ethylene and propylene using bis(pentamethylcyclopentadienyl)dimethyl zirconium and alumoxane as a catalyst. In Example 2 of this Publication, a blend of polyethylene and an ethylene/propylene copolymer having a number average molecular weight of 2,000, a weight average molecular weight of 8,300 and a propylene component content of 7.1 mole % and consisting of a toluene-soluble portion having a number average molecular weight of 2,200, a weight average molecular weight of 11,900 and a propylene component content of 30 mole % and a toluene-insoluble portion having a number average molecular weight of 3,000, a weight average molecular weight of 7,400 and a propylene component content of 4.8 mole % was obtained by polymerizing ethylene and propylene using bis(pentamethylcyclopentadienyl)zirconium dichloride, bis(methylcyclopentadienyl)zirconium dichloride and alumoxane as a catalyst. Like-wise, Example 3 of this Publication describes a blend of LLDPE and an ethylene/propylene copolymer composed of a soluble portion having a molecular weight distribution ($\overline{M}w/\overline{M}n$) of 4.57 and a propylene component content of 20.6 mole % and an insoluble portion having a molecular weight distribution of 3.04 and a propylene component content of 2.9 mole %.

Japanese Laid-Open Patent Publication No. 35007/1985 describes a process which comprises polymerizing ethylene alone or with an alpha-olefin having at least 3 carbon atoms in the presence of a catalyst system comprising metallocene and a cyclic alumoxane represented by the following formula

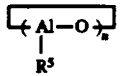

wherein $R^5$ represents an alkyl group having 1 to 5 carbon atoms, and n is an integer of 1 to about 20, or a linear alumoxane represented by the following formula

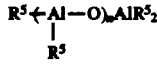

wherein $R^5$ and n are as defined above.

The Publication describes that the polymer obtained by the above process has a weight average molecular weight of about 500 to about 1,400,000 and a molecular weight distribution of 1.5 to 4.0.

Japanese Laid-Open Patent Publication No. 35008/1985 describes that polyethylene or a copolymer of ethylene and a $C_3$–$C_{10}$ alpha-olefin having a wide molecular weight distribution is produced by using a catalyst system comprising at least two types of metallocenes and alumoxane. The Publication states that the above copolymer has a molecular weight distribution ($\overline{M}w/\overline{M}n$) of 2 to 50.

These catalysts formed from transition metal compounds and aluminoxanes have much higher polymerization activity than the catalyst systems known heretofore.

On the other hand, methods using catalysts formed from solid catalyst components composed of the above transition metal compounds supported on porous inorganic oxide carriers such as silica, silica-alumina and alumina and aluminoxanes are proposed in Japanese Laid-Open Patent Publications Nos. 35006/1985, 35007/1985 and 35008/1985 which are cited above. Japanese Laid-Open Patent Publications Nos. 31404/1986, 108610/1986 and 106808/1985 propose methods using solid catalyst components supported on similar porous inorganic oxide carriers.

Furthermore, Japanese Laid-Open Patent Publications Nos. 260602/1985 and 130604/1985 propose a process for polymerizing olefins using catalysts formed from a transition metal compound and a mixed organoaluminum compound composed of an aluminoxane and an organoaluminum compound.

Japanese Laid-Open Patent Publication No. 260602/1985 discloses a process for producing a polyolefin by polymerizing an olefin using (1) as the transition metal compound, a compound of the following formula

wherein Cp is cyclopentadienyl, M is Ti, V, Zr or Hf, and each of $R^6$, $R^7$ and $R^8$ represents $C_1$–$C_6$ alkyl, cyclopentadienyl, halogen or hydrogen, and (2) as the organoaluminum compounds,
(2)-1 an aluminoxane synthesized from a trialkylaluminum and water and
(2)-2 a compound of the following formula

wherein $R^9$ is $C_1$–$C_{10}$ alkyl, cycloalkyl or aryl,

X is halogen, and n is a number of 1 to 3. This Laid-Open Patent Publication gives a working example in which ethylene is polymerized in a system comprising 3 millimoles of the aluminoxane, 3 millimoles of triethylaluminum and 0.003 millimole of bis(cyclopentadienyl)zirconium chloride in 400 ml of toluene as a polymerization medium.

Japanese Laid-Open Patent Publication No. 130604/1985 discloses a process for producing a poly-olefin by polymerizing an olefin using a catalyst composed of, as main components, (1) a transition metal compound of the following formula

wherein Cp is cyclopentadienyl, M is Ti, Zr or Hf, and each of $R^{10}$ and $R^{11}$ is H, halogen, $C_1$–$C_6$ alkyl or cyclopentadienyl, (2) an aluminoxane obtained by reacting a dialkyl monohalide of the formula

wherein $R^{12}$ is methyl or ethyl, and $X^1$ is halogen, with water, and (3) an organoaluminum compound represented by the following formula

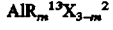

wherein $R^{13}$ is $C_1$–$C_{10}$ alkyl or cycloalkyl, $X^2$ is halogen, and m is a number of 1 to 3.

This Laid-Open Patent Publication gives examples of the amounts of the aluminoxane used per 400 ml of toluene as a polymerization medium, 4.5 millimoles (Examples 1–4 and 8), 3.6 millimoles (Example 5), 3.25 millimoles (Example 6), 10.0 millimoles (Example 7) and 9.0 millimoles (Example 9).

It is an object of this invention to provide a process for producing an alpha-olefin polymer having a narrow molecular weight distribution and a copolymer of alpha-olefins having a narrow molecular weight distribution and a narrow composition distribution when applied to the copolymerization of at least two olefins, especially a high-molecular-weight ethylene/alpha-olefin copolymer having a narrow molecular weight distribution and a narrow composition distribution, with excellent polymerization activity using a small amount of an aluminoxane.

Another object of this invention relates to a process for producing an olefin polymer having excellent powder properties and a narrow molecular weight distribution, and an olefin copolymer having a narrow molecular weight distribution and a narrow composition distribution when applied to the copolymerization of at least two olefins, especially an ethylene polymer or an ethylene/alpha-olefin copolymer having excellent powder properties and a narrow molecular weight distribution and/or a narrow composition distribution.

DISCLOSURE OF THE INVENTION

According to this invention, these objects and advantages of this invention are firstly achieved by a process for polymerizing olefins, which comprises polymerizing or copolymerizing olefins in the presence of a catalyst composed of (A) a solid catalyst component composed of a compound of a transition metal of Group IVB of the periodic table supported on an inorganic carrier, (B) an aluminoxane, and (C) an organoaluminum compound having a hydrocarbon group other than n-alkyl groups.

The catalyst in accordance with this invention is formed of the solid catalyst component (A), the aluminoxane (B) and the organoaluminum compound (C) having a hydrocarbon group other than n-alkyl groups. The catalyst component (A) is a solid catalyst component composed of a carrier and a compound of a transition metal of Group IVB of the periodic table supported on it.

The transition metal of Group IVB of the periodic table in the catalyst component (A) is preferably selected from the group consisting of titanium, zirconium and hafnium. Titanium and zirconium are more preferred, and zirconium is especially preferred.

The compound of a transition metal of Group IVB of the periodic table in the catalyst component (A) preferably has a group with a conjugated π-electron as a ligand.

Examples of the transition metal compound having a group with a conjugated π-electron as a ligand are compounds represented by the following formula (I)

  (I)

wherein $R^1$ represents a cycloalkadienyl group, $R^2$, $R^3$ and $R^4$ are identical or different and each represents a cycloalkadienyl group, an aryl group, an alkyl group, a cycloalkyl group, an aralkyl group, a halogen atom, a hydrogen atom, or a group of the formula $-OR^a$, $-SR^b$ or $-NR_2^c$ in which each of $R^a$, $R^b$ and $R^c$ represents an alkyl group, a cycloalkyl group, an aryl group, an aralkyl group or an organic silyl group, Me represents Zirconium, titanium or hafnium, k is 1, 2, 3 or 4, l, m and n are each 0, 1, 2 or 3, and k+l+m+n=4.

Examples of the cycloalkadienyl group represented presented by $R^1$ are a cyclopentadienyl group, a methylcyclopentadienyl group, an ethylcyclopentadienyl group, a dimethylcyclopentadienyl group an indenyl group and a tetrahydroindenyl group. Examples of the cycloalkadienyl group represented by $R^2$, $R^3$ and $R^4$ may be the same as above.

The aryl group represented by $R^2$, $R^3$ and $R^4$ is preferably a phenyl or tolyl group for example.

Likewise preferred examples of the aralkyl group are benzyl and neophile groups.

Examples of preferred alkyl groups are methyl, ethyl, propyl, isopropyl, butyl, hexyl, octyl, 2-ethyl-hexyl, decyl and oleyl groups.

Preferably, the cycloalkyl group way be, for example, a cyclopentyl, cyclohexyl, cyclooctyl, or norbornyl group.

The halogen atom may be, for example, fluorine, chlorine or bromine.

Specific examples of the groups $-OR^a$, $-SR^b$ and $-NR_2^c$ where $R^a$ $R^b$ and $R^c$ are alkyl cycloalkyl aryl and aralkyl will be clear from the above specific examples of these groups.

Examples of the organic silyl group for $R^a$, $R^b$ and $R^c$ are trimethylsilyl, triethylsilyl, phenyldimethylsilyl, diphenylmethylsilyl and triphenylsilyl groups.

Examples of zirconium compounds corresponding to formula (I) in which Me is zirconium are listed below.

bis(Cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(indenyl)zirconium dichloride,
bis(indenyl)zirconium dibromide,
bis(cyclopentadienyl)diphenylzirconium,
bis(cyclopentadienyl)dibenzylzirconium,
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bis(indenyl)ethoxyzirconium chloride,
bis(cyclopentadienyl)ethoxyzirconium,
bis(cyclopentadienyl)butoxyzirconium,
bis(cyclopentadienyl)2-ethylhexoxyzirconium,
bis(cyclopentadienyl)phenoxyzirconium chloride,
bis(cyclopentadienyl)cyclohexoxyzirconium chloride,
bis(cyclopentadienyl)phenylmethoxyzirconium chloride,
bis(cyclopentadienyl)methylzirconium phenylmethoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)thioethylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium, ethylenebis(indenyl)diethylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl) dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide
ethylenebis(4,5,6,7-tetrahydro-1-indenyl)zirconium diethoxide,
ethylenebis(4,5,6,7-tetrahydro-1-indenyl) methoxyzirconium chloride,
ethylenebis(4,5,6,7-tetrahydro-1-indenyl)ethoxyzirconium chloride, and
ethylenebis(4,5,6,7-tetrahydro-1-indenyl)methylzirconium ethoxide.

Examples of titanium compounds corresponding to formula (I) in which Me is titanium are listed below.

bis(Cyclopentadienyl)titanium monochloride monohydride,
bis(cyclopentadienyl)methyltitanium hydride,
bis(cyclopentadienyl)phenyltitanium chloride,
bis(cyclopentadienyl)benzyltitanium chloride,
bis(cyclopentadienyl)titanium chloride,
bis(cyclopentadienyl)dibenzyltitanium,
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium,
bis(cyclopentadienyl)ethoxytitanium,
ethylenebis(indenyl)titanium dichloride, and
ethylenebis(4,5,6,7-tetrahydro-1-indenyl)titanium dichloride.

Examples of hafnium compounds corresponding to formula (I) in which Me is hafnium are listed below.

bis(Cyclopentadienyl)hafnium monochloride monohydride,
bis(cyclopentadienyl)ethylhafnium hydride,
bis(cyclopentadienyl)phenylhafnium chloride,
bis(cyclopentadienyl)hafnium dichloride,
bis(cyclopentadienyl)dibenzylhafnium,
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride,
bis(cyclopentadienyl)bis(diethylamide)hafnium,
ethylenebis(indenyl)hafnium dichloride, and
ethylenebis(4,5,6,7-tetrahydro-1-indenyl)hafnium dichloride.

In the catalyst component (A), the IVB transition metal compound may be treated with an organic metal compound or a halogen-containing silicon compound prior to deposition. The organic metal compound may be, for example, an organoaluminum compound, an organoboron compound, an organomagnesium compound, an organozinc compound or an organolithium compound. The organoaluminum compound is preferred.

Examples of the organoaluminum compound include trialkylaluminums such as trimethylaluminum, triethylaluminum and tributylaluminum; alkenylaluminums such as isoprenylaluminum; dialkyl aluminum alkoxides such as dimethyl aluminum methoxide, diethyl aluminum ethoxide and dibutyl aluminum butoxide; alkyl aluminum sesquialkoxides such as methyl aluminum sesquimethoxide and ethyl aluminum sesquiethoxide; partially alkoxylated alkylaluminums having an average composition of the formula $R_{2.5}^1Al(OR^2)_{0.5}$; dialkyl aluminum halides such as dimethyl aluminum chloride, diethyl aluminum chloride and dimethyl aluminum bromide; alkyl aluminum sesquihalides such as methyl aluminum sesquichloride and ethyl aluminum sesquichloride; partially halogenated alkylaluminums, for example alkyl aluminum dihalides such as methyl aluminum dichloride and ethyl aluminum dichloride.

The trialkylaluminums and dialkyl aluminum chlorides are preferred, and above all trimethylaluminum, triethylaluminum and dimethyl aluminum chloride are preferred.

Triethylboron is a preferred example of the organoboron compound.

Examples of the organomagnesium compound are ethylbutylmagnesium, di-n-hexylmagnesium, ethyl magnesium bromide, phenyl magnesium bromide and benzyl magnesium chloride.

Diethylzinc is a preferred example of the organozinc compound.

Methyllithium, butyllithium and phenyllithium are examples of the organolithium compound.

As the halogen-containing silicon compound as a treating agent, compounds of the following formula (IV)

$$SiY_dR_e^5(OR^6)_{4-d-e} \quad (IV)$$

wherein Y is a chlorine or bromine atom, $R^5$ and $R^6$, independently from each other, represent an alkyl group having 1 to 12 carbon atoms, an aryl group, or a cycloalkyl group having 3 to 12 carbon atom, $\underline{d}$ is a number of 1 to 4 and $\underline{e}$ is a number of 0 to 4, provided that the sum of $\underline{d}$ and $\underline{e}$ is a number of 1 to 4, are preferably used.

Examples of such compounds include silicon tetrachloride, silicon tetrabromide, silicon trichloride, methylsilicon trichloride, ethylsilicon trichloride, propylsilicon trichloride, phenylsilicon trichloride, cyclohexylsilicon trichloride, silicon tribromide, ethylsilicon tribromide, dimethylsilicon dichloride, methylsilicon dichloride, phenylsilicon dichloride, methoxysilicon trichloride, ethoxysilicon trichloride, propoxysilicon trichloride, phenoxysilicon trichloride, ethoxysilicon tribromide, methoxysilicon dichloride, dimethoxysilicon dichloride, and silanol trichloride. These compounds may be used singly or in combination. Among them, silicon tetrachloride, silicon trichloride and methylsilicon trichloride are preferred.

The mixing ratio of the organometallic compound to the IVB transition metal compound in the above treatment, as the ratio of the amount of the organometallic compound in millimoles/the amount of the IVB transition metal compound in grams, is from 0.5 to 50, preferably from 1 to 30, more preferably from 1.5 to 20.

The treatment of the IVB transition metal compound with the organometallic compound in the preparation of the catalyst component (A) can be carried out by dispersing the IVB transition metal compound in an inert solvent, adding at least one of the above-described organometallic compounds, and treating the IVB transition metal compound at a temperature of 0° to 120° C., preferably 10° to 100° C., more preferably 20° to 90° C., for a period of 10 minutes to 10 hours, preferably 20 minutes to 5 hours, more preferably 30 minutes to 3 hours, under reduced or elevated pressure.

Examples of the inert solvent are aromatic hydrocarbons such as benzene toluene and xylene, aliphatic hydrocarbons such as pentane, hexane and isooctane and alicyclic hydrocarbons such as cyclohexane.

In the above-treatment, the mixing ratio of the IVB transition metal compound to the halogen-containing silicon compound, is such that the halogen-containing silicon compound is used in an amount of 0.001 to 10 moles, preferably 0.01 to 50 moles, more preferably 0.05 to 1 mole, per gram of the carrier compound. Preferably, after the above treatment, the liquid portion containing the excess of the halogen-containing silane compound, etc. is removed from the reaction mixture by such a method as filtration or decantation.

The treatment of the IVB transition metal compound with the halogen-containing silicon compound in preparing the catalyst component (A) may be carried out at a temperature of −50° to 200° C., preferably 0° to 100° C., more preferably 20° to 70° C., for a period of 10 minutes to 10 hours, preferably 20 minutes to 5 hours, under atmospheric, reduced or elevated pressure.

An inert solvent may be used in the above treatment. Examples of the inert solvent include aromatic hydrocarbons such as benzene, toluene and xylene, aliphatic hydrocarbons such as pentane, hexane, isooctane, decane and dodecane, alicyclic hydrocarbons such as cyclohexane and halogenated hydrocarbons such as chlorobenzene and ethylene dichloride.

In the deposition of the Group IVB transition metal compound on the inorganic carrier in the preparation of the catalyst component (A), an inert solvent needs not to be used when the transition metal compound is a liquid substance. If the transition metal compound is a solid substance at ordinary temperature, it is preferred generally to use an inert solvent capable of dissolving the transition metal compound.

The inert solvent used at this time may be the same inert solvent as that used in treating the inorganic carrier with the halogen-containing silicon compound. Aromatic hydrocarbons such as benzene and toluene and halogenated hydrocarbons such as chlorobenzene are especially preferred.

The amount of the transition metal compound used in the above supporting reaction is preferably 0.001 to 500 millimoles, more preferably 0.01 to 100 millimoles, especially preferably 0.1 to 50 millimoles, per gram of the inorganic carrier.

The amount of the inert solvent used in the above supporting reaction is preferably 0.5 to 1000 ml, more preferably 1 to 100 ml, especially preferably 2 to 50 ml, per gram of the inorganic carrier treated with the halogen-containing silane compound.

The above supporting reaction can be carried out by contacting and mixing the inorganic carrier and the transition metal compound at a temperature of 0 to 200° C., preferably 0° to 100° C., especially preferably 20° to 80° C., for a period of 1 minute to 10 hours, 5 minutes to 5 hours, 10 minutes to 3 hours.

After the supporting reaction by the above method, it is preferred to remove the liquid portion of the reaction mixture by such a method as filtration or decantation and wash the residue several times with an inert solvent.

In the catalyst of this invention, the solid catalyst component (A) is obtained by supporting the compound of a transition metal of Group IVB of the periodic table on the carrier.

The inorganic carrier is advantageously a granular or fine particulate solid having a particle diameter of, for example, 10 to 300 micrometers, preferably 20 to 200 micrometers. Preferably, it is a porous oxide. Specific examples include $SiO_2$, $Al_2O_3$, $MgO$, $ZrO_2$, $TiO_2$, $B_2O_3$, $CaO$, $ZnO$, $BaO$, $ThO_2$ and mixtures of these such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Carriers containing at least one component selected from the group consisting of $SiO_2$ and $Al_2O_3$ as a main component are preferred.

The inorganic oxides may contain small amounts of carbonates, sulfates, nitrates or oxide components such as $Na_2CO_3$, $K_2CO_3$, $CaCO_3$, $MgCO_3$, $Na_2SO_4$, $Al_2(SO_4)_3$, $BaSO4$, $KNO_3$, $Mg(NO_3)_2$, $Al(NO_3)_3$, $Na_2O$, $K_2O$ and $Li_2O$.

The porous inorganic carrier have different properties depending upon its type and the method of production. Carriers preferably used in this invention have a specific surface area of 50 to 1000 m²/g, preferably 100 to 700 m²/g and a pore volume of 0.3 to 2.5 cm²/g. The above carrier is used after it is calcined at a temperature of usually 150° to 1000° C., preferably 200° to 800° C.

In the catalyst component (A) in this invention, the compound of the transition metal of Group IVB of the periodic table is supported in an amount of $3 \times 10^{-3}$ to 3 milligram-atoms, preferably $5 \times 10^{-3}$ to 2 milligram-atoms, more preferably $1 \times 10^{-2}$ to 1 milligram-atom, as the transition metal atom, per gram of the inorganic carrier treated with the organometallic compound pound.

The catalyst component (A) contains the transition metal compound in an amount of usually 0,005 millimole to 5 millimoles, preferably 0.01 millimole to 1 millimole, especially preferably 0.03 millimole to 0.3 millimole, per gram of the inorganic carrier treated with the halogen-containing silicon compound.

The catalyst component (B) is an aluminoxane. The aluminoxane used as the catalyst component is, for example, an organoaluminum compound of the following formula (II)

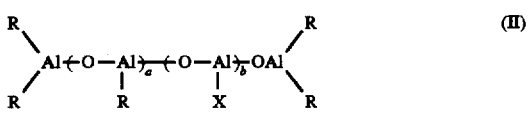

wherein R is a hydrocarbon group, X is a halogen atom, and $\underline{a}$ and $\underline{b}$, independently from each other, represent a number of 0 to 80 with the proviso that a and b are not simultaneously zero (in this formula, the degree of polymerization is a+b+2),
or the following formula (III)

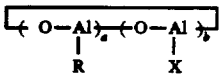

wherein R, X, a and b are as defined hereinabove with regard to formula (II) (in this formula, the degree of polymerization is a+b).

In formulae (II) and (III), R represents a hydrocarbon group such as an alkyl, cycloalkyl, aryl or aralkyl group. Preferred as the alkyl group are lower alkyl groups such as a methyl, ethyl, propyl or butyl group. Cyclopentyl and cyclohexyl groups are preferred examples of the cycloalkyl group. Preferred aryl groups are, for example, phenyl and tolyl groups. Preferably, the aralkyl group is, for example, a benzyl or neophile group. Of these, the alkyl groups are especially preferred.

X is a halogen atom such as fluorine, chlorine, bromine and iodine. Chlorine is especially preferred. a and b, independently from each other, are numbers of 0 to 80, with the proviso that a and b are not simultaneously zero.

When b is 0, formula (II) may be written as the following formula (II)-1

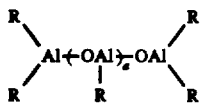 (II)-1 wherein R and a are as defined above, and formula (III) may be written as the following formula (III)-1

 (III)-1 wherein R and a are as defined above.

In formula (II)-1, a is preferably 2 to 50, more preferably 4 to 30. Furthermore, in formula (III)-1, a is preferably 4 to 52, more preferably 6 to 32.

a is preferably 0 to 40, more preferably 3 to 30, and b is preferably 1 to 40, more preferably 3 to 30.

The value of a+b is preferably 4 to 50, more preferably 8 to 30.

In formulae (II) and (III), the two units

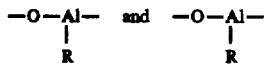

may be bonded in blocks or at random.

When a is 0 in formulae (II) and (III), it is desirable to use as organoaluminum compound of the following formula (V)

 (V)

wherein $R^7$ is an alkyl group having 1 to 10 carbon atoms or a cycloalkyl group having 3 to 12 carbon atoms, Z is a halogen atom, and f is a number of 1 to 3, together with the halogenated aluminoxane. Examples of such an organoaluminum compound include trimethylaluminum, triethylaluminum, tributylaluminum, trihexylaluminum, diethylaluminum chloride and ethylaluminum sesquichloride.

Preferably, the halogenated aluminoxane and the organoaluminum compound are used at this time such that the amount of the organoaluminum compound is 0.1 to 10 moles, preferably 0.3 to 3.0 moles, especially preferably 0.5 to 2.0 mole, per mole of Al atom in the halogenated aluminoxane.

The aluminoxane or the halogenated aluminoxane described above can be produced, for example, by the following methods.

(1) A method which comprises suspending a compound containing water of adsorption or a salt containing water of crystallization, such as magnesium chloride hydrate, nickel sulfate hydrate or cerous chloride hydrate in a medium such as benzene, toluene, ethyl ether or tetrahydrofuran, and reacting it with a trialkylaluminum and/or a dialkylaluminum monohalide.

(2) A method which comprises reacting a trialkylaluminum and/or a dialkylaluminum monohalide directly with water in a medium such as benzene, toluene, ethyl ether or tetrahydrofuran.

It is preferred to adopt the method (1). Incidentally, the aluminoxane may contain a small amount of an organometallic compound.

Then catalyst component (C) is an organoaluminum compound having a hydrocarbon group other than n-alkyl groups. Such a hydrocarbon group may be, for example, an alkyl group having a branched chain such as an iso-alkyl group, a cycloalkyl group and an aryl group. Examples of the above organoaluminum compound are trialkylaluminums such as triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri2-methylhexylaluminum, tri-3-methylhexylaluminum and tri-2-ethylhexylaluminum; tricycloalkylaluminums such as tricyclohexylaluminum; triarylaluminums such as triphenylaluminum and tritolylaluminum; dialkylaluminum hydrides such as diisobutylaluminum hydride; and alkylaluminum alkoxides such as isobutylaluminum methoxide, isobutylaluminum ethoxide and isobutylaluminum isopropoxide. Of these organoaluminum compounds, organoaluminum compounds having a branched alkyl group are preferred, and the trialkylaluminums are especially preferred. Furthermore, isoprenylaluminums having the general formula $(i\text{-}C_4C_9)_xAl_y(C_5H_{10})_z$ wherein x y and z are positive numbers and $z \geq 2\times$are also preferably used. There can also be used compounds which will yield the above organoaluminum compounds in the polymerization system, for example a combination of an aluminum halide and an alkyllithium or a combination of an aluminum halide and an alkylmagnesium, may also be used.

In the process of this invention, the polymerization of olefins may be carried out by a liquid-phase polymerization method (e.g., slurry polymerization or solution polymerization) or a gas-phase polymerization method. Prior to the olefin polymerization, prepolymerization may be carried out using a small amount of an olefin.

The prepolymerization is carried out (1) in the absence of solvent, or (2) in an inert hydrocarbon medium. Of these, the method (1) is preferred. Desirably, at this time, the catalyst components (A) and (B) are mixed in an inert hydrocarbon medium, and the solvent is removed by using an evaporator at room temperature or an elevated temperature under atmospheric or reduced pressure. The mole ratio of the transition metal atom in catalyst component (A) to the aluminum atom in catalyst component (B) in the prepolymerization treatment (Al/the transition metal atom) is from 20 to 5000, preferably from 25 to 2000, more preferably from 30 to 1000. The prepolymerization temperature is from –20° C. to 70° C., preferably –10° C. to 60° C., more preferably 0° C. to 50° C.

The treatment may be carried out either batch-wise or continuously under reduced, atmospheric or elevated pressure. The prepolymerization may be carried out in the presence of a molecular weight controlling agent such as hydrogen, but it is preferred to limit its amount at least to one sufficient to produce a prepolymer having an intrinsic viscosity [η], measured in decalin at 135° C. of at least 0.2 dl/g, preferably 0 5 to 20 dl/g.

The amount of the transition metal compound (A) at the time of performing the process of this invention by the slurry polymerization technique or the gas-phase polymerization technique is, in terms of the concentration of the transition metal atom in the polymerization reaction system, $10^{-8}$ to $10^{-2}$ gram-atom/liter, preferably $10^{-7}$ to $10^{-3}$ gram-atom/liter.

In the process of this invention, the amount of the aluminoxane (B), calculated as the aluminum atom in the reaction system, is not more than 3 milligram-atoms/ liter, preferably 0.1 to 2.5 milligram-atoms/liter, especially preferably 0.2 to 2 milligram-atoms/liter. The proportion of the aluminum atoms of the aluminoxane component (B) based on the total amount of the aluminum atoms in the aluminoxane component (B) and the organoaluminum compound component (C) is usually 20 to 80%, preferably 25 to 75 mole %, and especially preferably 30 to 70%. Corresponding to this amount, the proportion of the aluminum atom in the organoaluminum compound component (C) is usually 20 to 80%, preferably 25 to 75%, especially preferably 30 to 70%. In the process of this invention, the ratio of the total amount of aluminum atoms in the aluminoxane component (B) and the organoaluminum compound component (C) to the transition metal atom in the reaction system is usually from 20 to 1000, preferably from 50 to 5000, especially preferably from 100 to 2000.

According to the above catalyst in accordance with this invention, olefins can be polymerized or copolymerized advantageously.

Investigations of the present inventors have shown that when a compound of a transition metal of group IV of the periodic table and containing a ligand having a conjugated π-electron and a ligand containing hereto atom capable of being bonded to the transition metal and selected from the group consisting of oxygen, sulfur, nitrogen and phosphorus is used as the transition metal compound in the catalyst system, the resulting compound shows the same excellent activity as the catalyst System composed of the components (A), (B) and (C) even if it is not supported on the inorganic carrier.

Accordingly, the present invention secondly provides a process for producing olefins, which comprises polymerizing or copolymerizing the olefins in the presence of a catalyst composed of (A)' a compound of a transition metal of Group IV of the periodic table containing a ligand having a conjugated πelectron and a ligand containing a hereto atom capable of being bonded to the transition metal and selected from the group consisting of oxygen, sulfur, nitrogen and phosphorus, (B) an aluminoxane, and (c) an organoaluminum compound having a hydrocarbon group other than n-alkyl groups.

For example, the transition metal compound (A)' may preferably be a compound of the following formula (I)'

wherein $R^{11}$ is cycloalkadienyl, $R^{12}$ is selected from the class consisting of $-OR^a$, $-SR^b$, $-NR_2^c$ and $-PR_2^d$, $R^{13}$ and $R^{14}$, independently from each other, represent cycloalkadienyl, aryl, aralkyl, halogen or hydrogen, $R^a$, $R^b$ and $R^c$ represent alkyl, cycloalkyl, aryl, aralkyl or organic silyl, Me is zirconium, titanium, or hafnium, k and l are 1, 2 or 3, m and n are 0, 1 or 2 and k+l+m+n=4.

Examples of the compounds of formula (I)' include zirconium compounds such as bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexoxyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bis(indenyl)ethoxyzirconium chloride,
bis(cyclopentadienyl)ethoxyzirconium,
bis(cyclopentadienyl)butoxyzirconium,
bis(cyclopentadienyl)2-ethylhexoxyzirconium,
bis(cyclopentadienyl)phenoxyzirconium chloride,
bis(cyclopentadienyl)cyclohexoxyzirconium chloride,
bis(cyclopentadienyl)phenylmethoxyzirconium chloride,
bis(cyclopentadienyl)methylzirconium phenylmethoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride, and
ethylenebis(4,5,6,7-tetrahydro-1-indenyl)ethoxyzirconium chloride; titanium compounds such as
bis(cyclopentadienyl)ethoxytitanium chloride,
bis(cyclopentadienyl)butoxytitanium chloride,
bis(cyclopentadienyl)methyltitanium ethoxide,
bis(cyclopentadienyl)phenoxytitanium chloride,
bis(cyclopentadienyl)trimethylsiloxytitanium chloride,
bis(cyclopentadienyl)thiophenyltitanium chloride,
bis(cyclopentadienyl)bis(dimethylamide)titanium and
bis(cyclopentadienyl)ethoxytitanium; and
hafnium compounds such as
bis(cyclopentadienyl)ethoxyhafnium chloride,
bis(cyclopentadienyl)butoxyhafnium chloride,
bis(cyclopentadienyl)methylhafnium ethoxide,
bis(cyclopentadienyl)phenoxyhafnium chloride,
bis(cyclopentadienyl)thiophenylhafnium chloride, and
bis(cyclopentadienyl)bis(diethylamide)hafnium.

It should be understood that in the process of this invention using the above catalyst system composed of the catalyst components (A)', (B) and (C), the preferred concentrations and proportions of these catalyst components (A)', (B) and (C) are the same as described hereinabove with the aforesaid catalyst system.

Investigations of the present inventors have also shown that by limiting the amount of the aluminoxane used to not more than 3 milligram-atoms/liter as Al atom in the catalyst system composed of the components (A), (B) and (C) and the catalyst system composed of (A)', (B) and (C), excellent catalytic activity can be exhibited.

On the basis of this fact, it has been found that when the amount of the aluminoxane used is limited to not more than 3 milligram-atoms/liter as Al atom in the reaction system, the use of any of the compounds of formula (I) as the group IVB transition metal compounds without being supported on the inorganic carrier can exhibit the same excellent activity.

Accordingly, the present invention thirdly provides a process for polymerizing or copolymerizing olefins in the presence of a catalyst composed of (A)" a compound of a transition metal of Group IVB of the periodic table, (B) an aluminoxane in a concentration of not more than 3 milligrams/liter as aluminum atom in the reaction system, and (C) an organoaluminum compounds having a hydrocarbon group other than n-alkyl groups.

The same compounds as represented by formula (I) can be used as the transition metal compound (A)".

The aluminoxane (B) and the organoaluminum compound (C) may be the same as described above.

In the process of this invention, the catalyst components (A)", (B) and (C) may be separately fed into the reaction system. Or it is possible to add a premixture of any two of the above compounds and the remaining one catalyst component separately into the reaction system. Alternatively, all the catalyst components may be pre-mixed and then fed into the reaction system. When two catalyst components are to be mixed in advance, the catalyst components to be mixed are preferably the catalyst components (A) and (B).

In the premixing of the catalyst components (A) and (B), the concentration of the transition metal atom is usually $2.5 \times 10^{-4}$ to $1.5 \times 10^{-1}$ gram-atom/liter, preferably $5.0 \times 10^{-4}$ to $1.0 \times 10^{-1}$ gram-atom/liter. The concentration of the aluminoxane is usually 0.05 to 5 gram-atoms/liter, preferably 0.1 to 3 gram-atoms/liter, as Al atom. The temperature in the premixing is usually $-50°$ C. to $100°$ C., and the mixing time is usually 0.1 minute to 50 hours.

It should be understood that the preferred concentrations and mixing ratios of the components (A)", (B) and (C) in the polymerization system are the same as in the above catalyst system.

All the catalysts described above can be used advantageously in the homopolymerization or copolymerization of olefins. They are especially effective for the production of an ethylene polymer and ethylene/alpha-olefin copolymers. Examples of the olefins that can be utilized are ethylene and alpha-olefins having 3 to 20 carbon atoms, such as propylene, 1-butene, 1-hexene, 4-methyl-1-pentene, 1-octene, 1-decene, 1-dodecene, 1-tetradecene, 1-hexadecene, 1-octadecene and 1-eicocene.

The polymerization of olefins by the process of this invention is usually carried out in a gas-phase or in a liquid phase, for example in slurry. In the slurry polymerization, an inert hydrocarbon may be used as a solvent. It is also possible to use an olefin itself as the solvent.

Specific examples of the hydrocarbon solvent are aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane, aromatic hydrocarbons such as benzene, toluene and xylene, and petroleum fractions such as gasoline, kerosene and light oil. Of these hydrocarbon media, the aliphatic hydrocarbons, alicyclic hydrocarbons and petroleum fractions are preferred.

When slurry polymerization is carried out in the process of this invention, the polymerization temperature is usually $-50°$ to $120°$ C., preferably $0°$ to $100°$ C.

When slurry polymerization or gas-phase polymerization is carried out by the process of this invention, the proportion of the transition metal compound is usually $10^{-8}$ to $10^{-2}$ gram-atom/liter, preferably $10^{-7}$ to $10^{-3}$ gram-atom/liter as the transition metal atom in the polymerization system.

In the present polymerization reaction, the aluminoxane may, or may not, be used additionally. To obtain a polymer having excellent powder properties, it is preferred not to use the aluminoxane additionally.

The polymerization pressure is usually atmospheric pressure to 100 $kg/cm^2$, preferably 2 to 50 $kg/cm^2$. The polymerization may be carried out batchwise, semi-continuously or continuously.

The polymerization may be carried out in two or more stages having different reaction conditions.

When the slurry polymerization method or the gas-phase polymerization method is used to polymerize olefins, particularly polymeric ethylene or ethylene with an alpha-olefin in this invention, there is no polymer adhesion to the reactor and the resulting polymer has excellent powder properties and a narrow molecular weight distribution. When the invention is applied to the copolymerization of at least two olefins, an olefin copolymer having a narrow molecular weight distribution and a narrow composition distribution can be obtained.

[EXAMPLES]

The process of this invention will now be specifically illustrated by the following examples. The $\overline{M}w/\overline{M}n$ value was measured by the following procedure in accordance with Takeuchi, "Gel Permeation Chromatography", published by Maruzen Co., Ltd.

(1) By using standard polystyrene of a known molecular weight (monodisperse polystyrene produced by Toyo Soda Co., Ltd.), the molecular weight M and its GPC (gel permeation chromatograph) count are measured. A calibration curve of the molecular weight M versus EV (elution volume) is prepared. The concentration at this time is adjusted to 0.02% by weight.

(2) The GPC chromatogram of the sample is taken by GPC, and the number average molecular weight $\overline{M}n$ and the weight average molecular weight $\overline{M}w$ of the sample are calculated as polyethylene by the procedure (1) above, and the $\overline{M}w/\overline{M}n$ value is determined. The sample preparation conditions and the GPC measurement conditions at this time are as follows:

Sample preparation:

(a) Take the sample together with o-dichlorobenzene solvent in an Erlenmeyer flask so that its concentration is 0.1% by weight.

(b) Heat the flask to $140°$ C and stir the contents for about 30 minutes to dissolve the sample.

(c) Subject the filtrate from it to GPC. GPC measurement conditions:

(a) Device: 150C-ALC/GPC made by Waters Co.

(b) Column: GMH type made by Toyo Soda Co., Ltd.

(c) Amount of the sample: 400 microliters (d) Temperature: $140°$ C.

(e) Flow rate: 1 ml/min.

The amount of an n-decane-soluble portion in the copolymer (as the amount of the soluble portion is smaller, the narrow is the composition distribution) was measured by adding about 3 g of the copolymer to 450 ml of n-decane, dissolving the copolymer at $145°$ C., cooling the solution to $23°$ C, removing the n-decane-insoluble portion by filtration, and recovering the n-decane-soluble portion from the filtrate. The B value of the ethylenic copolymer of this invention is defined as follows:

$$B \equiv \frac{P_{OE}}{2P_O \cdot P_E}$$

wherein $P_E$ represents the molar fraction of the ethylene component in the copolymer, $P_O$ represents the molar fraction of the alpha-olefin component, and $P_{OE}$ represents the molar fraction of the alpha-olefin/ethylene sequence in the total dyad sequence.

The B value is an index showing the state of distribution of the individual monomer components in the copolymer and is calculated by determining $P_E$, $P_O$ and $P_{OE}$ in the above definition in accordance with the papers of G. J. Ray [Macromolecules, 10, 773 (1977)], J. C. Randall [Macromolecules, 15, 353 (1982), J. Polymer Science, Polymer Physics Ed., 11, 275 (1973)], and K. Kimura [Polymer, 25, 441 (1984)]. As the B value is larger, the amount of block-like sequences is smaller and the distribution of ethylene and the alpha-olefin is more uniform. Thus, the copolymer has a narrower composition distribution.

The composition distribution B value is determined as follows: About 200 mg of the copolymer is uniformly dissolved in 1 ml of hexachlorobutadiene in a sample tube having a diameter of 10 mm, and a $^{13}$C-NMR spectrum of the sample is taken usually at a temperature of 120° C. under the following conditions.

Measuring frequency: 25.05 MHz

Spectral width: 1500 Hz

Filter width: 1500 Hz

Pulse repeating time: 4.2 sec

Pulse width: 7 microseconds

Number of integrations: 2000 to 5000

From the spectrum, $P_E$, $P_O$ and $P_{OE}$ are determined, and the B value is calculated from them.

Example 1

Preparation of aluminoxane

A 400 ml flask purged fully with nitrogen was charged with 37 g of $Al_2(SO_4)_3 \cdot 14H_2O$ and 125 ml of toluene. The flask was cooled to 0° C. and 500 millimoles of trimethyl aluminum diluted with 125 ml of toluene was added dropwise. The mixture was heated to 40° C, and the reaction was continued at this temperature for 10 hours. After the reaction, the reaction mixture was subjected to solid-liquid separation by filtration. Toluene was removed from the filtrate to give 13 g of aluminoxane as a white solid. It has a molecular weight, determined by freezing point depression in benzene, of 930. Its m value in the catalyst component [B] was 14.

Polymerization

Toluene (500 ml) was introduced into a 1-liter glass autoclave fully purged with nitrogen, and a gaseous mixture of ethylene and propylene (120 liters/hr, and 80 liters/hr, respectively) was passed through the flask and left to stand at 20° C. for 10 minutes. Then, 0.5 millimole of triisobutyl aluminum was added. Five minutes later, 0.25 milligram-atom, as aluminum atom, of the aluminoxane and subsequently $2.5 \times 10^{-3}$ millimole of bis(cyclopentadienyl) zirconium dichloride were added, and the polymerization was started. The gaseous mixture of ethylene and propylene was continuously fed, and polymerized at 20° C. under atmospheric pressure for 1 hour. After the polymerization, a small amount of methanol was added to stop the polymerization. The polymer solution was poured into a large excess of methanol to precipitate the polymer. The precipitated polymer was dried at 130° C. under reduced pressure for 12 hours. There was consequently obtained 19.1 g of a polymer having an MFR of 0.31 g/min., an ethylene content, measured by $^{13}$C-NMR, of 84.1 mole %, an $\overline{M}w/\overline{M}n$ of 2.39 and a B value of 1.13.

Comparative Example 1

Example 1 was repeated except that in the polymerization of Example 1, triisobutyl aluminum was not used. Hardly any polymer was obtained.

Examples 2–9 and Comparative Examples 2–6

Polymerization was carried out under the conditions described in Table 1 by the same operation as in Example 1. The results are shown in Table 2.

Example 10

Polymerization

A 2-liter stainless steel autoclave fully purged with nitrogen was charged with 250 ml of hexane and 750 ml of 4-methyl-1-pentene, and heated to 35° C. Then, 0.25 millimole of triisobutyl aluminum, 0.5 milligram-atom, calculated as aluminum atom, of the aluminoxane synthesized in Example 1, and $1 \times 10^{-3}$ millimole of bis(cyclopentadienyl) zirconium dichloride were introduced into the autoclave. Ethylene was subsequently introduced and the polymerization was started. Ethylene was continuously fed so as to maintain the total pressure at 8 kg/cm$^2$-G; and polymerized at 45° C. for 1 hour. The subsequent operation was carried out in the same way as in Example 1 to give 33.1 g of a polymer having an MFR of 0.55 g/10 min., a density of 0.901 g/cm$^3$, an $\overline{M}w/\overline{M}n$ of 2.92 and a decane-soluble weight fraction at room temperature of 1.8% by weight.

Example 11–13 and Comparative Example 7

Polymerization was carried out under the condition described in Table 3 by the same operation as in Example 10. The results are shown in Table 4.

TABLE 1

| | Transition metal compound (mmol/l) | Aluminoxane (mmol/l) | Alkyl aluminum Type | (mmol/l) | Monomer 1 Type | (l/hr) | Monomer 2 Type | (l/hr) |
|---|---|---|---|---|---|---|---|---|
| Example 1 | $5 \times 10^{-3}$ | 0.5 | (i-Bu)$_3$Al | 1 | ethylene | 120 | propylene | 80 |
| Example 2 | " | 1 | " | " | " | " | " | " |
| Example 3 | " | 0.25 | " | " | " | " | " | " |
| Example 4 | " | 0.5 | TMPAL* | " | " | " | " | " |
| Example 5 | " | " | TEHAL** | " | " | " | " | " |
| Example 6 | $2 \times 10^{-2}$ | " | (i-Bu)$_3$Al | " | " | 30 | " | 160 |
| Example 7 | " | " | " | " | — | — | " | 100 |

TABLE 1-continued

|  |  |  |  |  |  | ethylene | 120 |  | 80 |
|---|---|---|---|---|---|---|---|---|---|
| Example 8 | $5 \times 10^{-3}$ | " | isoprenyl aluminum | " | | | | | |
| Example 9 | " | " | isoprenyl aluminum | " | | " | 100 | " | 100 |
| Comp. Example 1 | $5 \times 10^{-3}$ | 0.5 | — | — | | ethylene | 120 | propylene | 80 |
| Comp. Example 2 | " | 1 | — | — | | " | " | " | " |
| Comp. Example 3 | " | 0.5 | Et$_3$Al | 1 | | " | " | " | " |
| Comp. Example 4 | " | " | (n-Bu)$_3$Al | " | | " | " | " | " |
| Comp. Example 5 | " | " | (n-C$_6$H$_{13}$)$_3$Al | " | | " | " | " | " |
| Comp. Example 6 | " | " | (n-C$_8$H$_{17}$)$_3$Al | " | | " | " | " | " |

|  | Polymerization temperature (°C.) | Polymerization time (hr) | Amount yielded (g) | Activity (g-polymer/mmol-Zr) |
|---|---|---|---|---|
| Example 1 | 20 | 1 | 19.1 | 7640 |
| Example 2 | " | 0.5 | 23.8 | 9520 |
| Example 3 | 30 | 1 | 7.7 | 3080 |
| Example 4 | 20 | " | 18.4 | 7360 |
| Example 5 | " | " | 18.7 | 7480 |
| Example 6 | 40 | " | 5.9 | 590 |
| Example 7 | 20 | 2 | 2.0 | 200 |
| Example 8 | " | 1 | 10.3 | 4120 |
| Example 9 | " | " | 9.4 | 3760 |
| Comp. Example 1 | 20 | 1 | trace | — |
| Comp. Example 2 | " | 0.5 | 12.2 | 4880 |
| Comp. Example 3 | " | 1 | trace | — |
| Comp. Example 4 | " | " | 1.4 | 560 |
| Comp. Example 5 | " | " | 1.4 | 560 |
| Comp. Example 6 | " | " | 0.4 | 560 |

*TMPAL; Tri(2-methylpentyl)aluminum
**TEHAL; Tri(2-ethylhexyl)aluminum

TABLE 2

|  | MFR (g/10 min.) | Ethylene content (mol %) | $\bar{M}w/\bar{M}n$ | B value | [η]* (dl/g) |
|---|---|---|---|---|---|
| Example 1 | 0.31 | 84.1 | 2.39 | 1.13 | — |
| Example 2 | 0.59 | 83.4 | 1.95 | 1.13 | — |
| Example 3 | 0.20 | 85.2 | 2.32 | 1.12 | — |
| Example 4 | 0.30 | 82.3 | 2.28 | 1.15 | — |
| Example 5 | 0.26 | 80.5 | 2.03 | 1.19 | — |
| Example 6 | — | 61.0 | 1.98 | — | 0.21 |
| Example 7 | — | 0 | 2.03 | — | 0.08 |
| Example 8 | 0.67 | 85.5 | 2.36 | 1.12 | — |
| Example 9 | 3.88 | 80.1 | 2.05 | 1.18 | — |
| Comp. Example 1 | — | — | — | — | — |
| Comp. Example 2 | 0.64 | 83.8 | 2.37 | 1.13 | — |
| Comp. Example 3 | — | — | — | — | — |
| Comp. Example 4 | — | 85.4 | — | 1.11 | 2.14 |
| Comp. Example 5 | — | 85.8 | — | 1.11 | 2.20 |
| Comp. Example 6 | — | 86.2 | — | 1.10 | 2.09 |

*Measured in decalin at 135° C.

TABLE 3

|  | Transition metal compound (mmol/l) | Aluminoxane (mmol/l) | Alkyl aluminum Type | Alkyl aluminum (mmol/l) | Total pressure (kg/cm²-G) | Comonomer Type | Comonomer (ml) |
|---|---|---|---|---|---|---|---|
| Example 10 | $1 \times 10^{-3}$ | 0.5 | (i-Bu)$_3$Al | 0.25 | 8 | 4-methyl-1-pentene | 750 |
| Example 11 | " | " | " | " | " | 1-hexene | 650 |
| Example 12 | " | 1 | " | 0.5 | " | 4-methyl-1-pentene | 750 |
| Example 13 | " | 0.5 | isoprenyl aluminum | 0.25 | " | " | " |
| Comp. Example 7 | $1 \times 10^{-3}$ | 0.5 | — | — | 8 | 4-methyl-1-pentene | 750 |

|  | Polymerization temperature (°C.) | Polymerization time (hr) | Amount yielded (g) | Activity (g-polymer/mmol-Zr) |
|---|---|---|---|---|
| Example 10 | 45 | 1 | 33.1 | 33100 |
| Example 11 | " | " | 35.4 | 35400 |
| Example 12 | " | " | 48.7 | 48700 |

TABLE 3-continued

| | | | | |
|---|---|---|---|---|
| Example 13 | " | " | 18.3 | 18300 |
| Comp. Example 7 | " | " | 2.9 | 2900 |

TABLE 4

| | MFR (g/10 min.) | Density (g/cm$^3$) | $\overline{Mw}/\overline{Mn}$ | n-decane-soluble portion at room temperature (wt %) |
|---|---|---|---|---|
| Example 10 | 0.55 | 0.901 | 2.92 | 1.8 |
| Example 11 | 0.46 | 0.898 | 2.88 | 2.1 |
| Example 12 | 0.59 | 0.904 | 2.98 | 2.0 |
| Example 13 | 1.03 | 0.902 | 3.02 | 2.3 |
| Comp. Example 7 | 0.82 | 0.910 | 2.90 | 0.72 |

Example 14

A 1-liter continuous polymerization reactor was continuously fed with 500 ml/hr of toluene, 0.5 milligram-atom/hr, calculated as aluminum atom, of the aluminoxane synthesized in Example 1, and 5×10$^{-3}$ millimole/hr of bis(cyclopentadienyl)zirconium dichloride, and simultaneously, 150 liters/hr of ethylene, 100 liters/hr of propylene and 1.2 g/hr of 5-ethylidene-2-norbornene (ENB) were continuously fed into the reactor, and polymerized at 20° C. under atmospheric pressure with a residence time of 1 hour and a polymer concentration of 15 g/liter. The resulting polymerization product was worked up as in Example 1 to give an ethylene/propylene/EMB copolymer having an MFR of 2.25 g/10 min., an ethylene content, measured by $^{13}$C-NMR, of 86.9 mole %, an $\overline{Mw}/\overline{Mn}$ of 2.45, and an iodine value of 11.

Comparative Example 8

Example 1 was repeated except that in the polymerization of Example 1, triisobutyl aluminum was not used, the amount of the aluminoxane was changed to 2.5 milligram-atoms calculated as aluminum atom, and the polymerization was carried out for 30 minutes. There was obtained 22.8 g of a polymer having an MFR of 1.63 g/10 min., an ethylene content of 82.8 mole %, an $\overline{Mw}/\overline{Mn}$ of 1.92 and a B value of 1.14.

Example 15

Pre-mixing of the catalyst components [A] and [B]

To a 100 ml glass flask fully purged with nitrogen, 4.7 ml of a toluene solution (Al 0.85 mole/ liter) of the aluminoxane synthesized in Example 1, 2.4 ml of a toluene solution (Zr 0.01 mole/liter) of bis(cyclopentadienyl)zirconium dichloride and 12.9 mol of toluene were added, and stirred at 22° C. for 1 hour to give a yellow transparent solution.

Polymerization

A 2-liter stainless steel autoclave fully purged with nitrogen was charged with 500 ml of hexane, 500 ml of 4-methyl-1-pentene and 0.5 millimole of triisobutyl aluminum, and heated to 47° C. Thereafter, 2.5 ml of the solution prepared as above was forced into the autoclave under ethylene pressure, and the polymerization was started. Ethylene was continuously fed so as to maintain the total pressure at 7 kg/cm$^2$-G, and the polymerization was carried out at 50° C. for 1 hour. There was obtained 71.4 g of a polymer having an MFR of 1.08 g/10 min., a density of 0.902 g/cm$^3$, an $\overline{Mw}/\overline{Mn}$ of 2.90 and a decane-soluble portion weight fraction at room temperature of of 1.5% by weight.

Example 16

Pre-mixing of catalyst components [A] and [B]

The procedure described in Example 15 was repeated except that 4.8 ml of a toluene solution (Zr 0.01 mole/liter) of bis(cyclopentadienyl)zirconium dichloride and 10.5 ml of toluene were used.

Polymerization

Example 15 was repeated except that 1.25 ml of the solution prepared above was used. There was obtained 46.1 g of a polymer having an MFR of 0.82 g/min., a density of 0.904 g/cm$^3$, an $\overline{Mw}/\overline{Mn}$ of 2.86 and a decane-soluble portion weight fraction at room temperature of 1.3% by weight.

Example 17

Pre-mixing of catalyst components [A] and [B]

In Example 15, 12.0 ml of a toluene solution (Zr 0.04 mole/liter) of bis(cyclopentadienyl)zirconium dichloride, 6.3 ml of a toluene solution (Al 2.55 moles/ liter) of the aluminoxane synthesized in Example 1 and 1.7 ml of toluene were stirred at 22° C. for 30 minutes to give a deep yellow transparent solution.

Polymerization

Example 15 was repeated except that 0.125 ml of the solution prepared above and 1.0 millimole of triisobutyl aluminum were used and the polymerization was carried out at 60° C. for 1 hour. There was obtained 38.5 g of a polymer having an MFR of 1.09 g/10 min., a density of 0.902 g/cm$^3$, an $\overline{Mw}/\overline{Mn}$ of 2.82 and a decane-soluble portion weight fraction at room temperature of 1.3% by weight.

Example 18

Polymerization

A 2-liter stainless steel autoclave fully purged with nitrogen was charged with 500 ml of toluene, 1 milligram-atom, calculated as aluminum atom, of the aluminoxane synthesized in Example 1, and 2 millimoles of triisobutyl aluminum.

Furthermore, propylene was introduced at 5 kg/cm$^2$-G at 30° C. Thereafter, the introduction of propylene was stopped, and the mixture was cooled to −10° C. Then, 1×10$^{-3}$ millimole of ethylenebis(indenyl)zirconium dichloride was introduced into the autoclave, and the polymerization was started. By performing the polymerization at −10° C. for 6 hours, 44.2 g of a polymer was obtained.

Comparative Example 9

Example 18 was repeated except that in the polymerization of Example 18, triisobutyl aluminum was not used. There was obtained 2.4 g of a polymer.

Example 19

Preparation of aluminoxane

A 400 ml flask fully purged with nitrogen was charged with 37 g of $Al_2(SO_4)_3 \cdot 14H_2O$ and 125 ml of toluene, and cooled to 0° C. Then, 500 millimoles of trimethyl aluminum diluted with 125 ml of toluene was added dropwise. The temperature was then elevated to 40° C., and the reaction was continued at this temperature for 10 hours. After the reaction, the reaction mixture was subjected to solid-liquid separation by filtration. Toluene was removed from the filtrate to obtain 13 g of aluminoxane as a white solid. It had a molecular weight, determined by freezing point depression in benzene, of 930. It shows an m value of 14 in catalyst component [B].

Preparation of a zirconium catalyst

A 200 ml flask fully purged with nitrogen was charged with 3.8 g of calcined silica obtained by calcining silica (average particle diameter 70 microns, specific surface area 260 $m^2/g$, pore volume 1.65 $cm^3/g$) at 300° C. for 4 hours, and, 51.5 ml of a toluene solution (Al 0.49 mole/liter) of aluminoxane, and they were stirred at room temperature for 10 minutes. Then, toluene was removed by an evaporator at room temperature to give a solid product. To the solid product was added 7.9 ml of a toluene solution (Zr 0.04 millimole/liter) of bis(cyclopentadienyl)zirconium dichloride, and again toluene was removed by an evaporator at room temperature to give a catalyst component having a Zr content of 0.54% by weight. A gaseous mixture of ethylene and nitrogen (30 liters/hr and 45 liters/hr, respectively) was passed through the resulting catalyst component at room temperature for 30 minutes to obtain a solid catalyst component in which ethylene was polymerized in an amount of 0.86 g per gram of the catalyst.

Polymerization

A 2-liter stainless steel autoclave fully purged with nitrogen was charged with 900 ml of hexane and 100 ml of 1-hexane, and heated to 45° C. Then, 1 millimole of triisobutyl aluminum and 0.015 milligram-atom, calculated as zirconium atom, of the zirconium catalyst subjected to prepolymerization with ethylene were charged. The temperature was then elevated to 60° C. Subsequently, ethylene was introduced and the polymerization was started. Ethylene was continuously fed so as to maintain the total pressure at 7 $kg/cm^2$-G, and the polymerization was carried out at 70° C. for 2 hours. After the polymerization, the polymer slurry was added to a large excess of methanol, and the mixture was filtered. The resulting polymer was dried at 80° C. for 12 hours under reduced pressure to give 101.2 g of a polymer having an MFR of 0.16 g/10 min., a density of 0.916 $g/cm^3$, an $\overline{M}w/\overline{M}n$ of 2.98, a bulk density of 0.33 $g/cm^3$ and an n-decane soluble weight fraction at room temperature of 0.31% by weight. The polymerization conditions, etc. are shown in Table 5.

Example 20

Example 19 was repeated except that the amount of ethylene prepolymerized was changed to 0.66 g per gram of the catalyst.

Polymerization

Example 19 was repeated except that 1-hexane was not used, 1000 ml of hexane was used as a solvent, and ethylene was homopolymerized under a total pressure of 6 $kg/cm^2$-G.

The results are shown in Table 6.

Comparative Example 10

Polymerization

Example 20 was repeated except that isobutyl aluminum was not used. The results are shown in Table 6.

Example 21

Polymerization

A 2-liter stainless steel autoclave purged fully with nitrogen was charged with 250 g of sodium chloride (special reagent grade, Wako Pure Chemicals, Co., Ltd.), and dried under reduced pressure at 90° C. for 1 hour. Then, the autoclave was cooled to 65° C., and the inside of the autoclave was replaced by ethylene. Subsequently, 1 millimole of triisobutyl aluminum, 0.015 milligram-atom, calculated as zirconium atom, of the zirconium catalyst prepared in Example 19, and 10 ml of 1-hexene were introduced. Furthermore, ethylene was introduced, and the total pressure was adjusted to 8 $kg/cm^2$-G. The polymerization was started. Thereafter, only ethylene was supplied, and the polymerization was carried out at 70° C. for 2 hours while maintaining the total pressure at 8 $kg/cm^2$-G. After the polymerization, the reaction mixture was washed with water to remove sodium chloride. The remaining polymer was washed with methanol, and dried overnight at 80° C. under reduced pressure. The polymer was yielded in an amount of 46.8 g, and had an MFR of 1.45 g/10 min., a density of 0.925 $g/cm^3$, an $\overline{M}w/\overline{M}n$ of 3.03, a bulk density of 0.31 $g/cm^3$ and an n-decane-soluble portion weight fraction of 0.10% by weight.

Example 22

Example 21 was repeated except that in the polymerization of Example 21, 1-hexene was not used, triisobutyl aluminum and the zirconium catalyst were added at 75° C., and the polymerization was carried out at 80° C. for 1 hour. The results are shown in Table 6.

Examples 23–26

Polymerization was carried out under the conditions indicated in Table 5 in the same way as in Example 19. The results are shown in Table 6.

Example 27

Preparation of a zirconium catalyst

A 200 ml flask purged fully with nitrogen was charged with 5.8 g of calcined alumina obtained by calcining alumina (average particle diameter 60 microns, specific surface area 290 $m^2/g$, pore volume 1.05 ml/g) at 500° C. for 5 hours, 17 ml of a toluene solution (Al 1 mole/liter) of dimethylaluminum monochloride, and 50 ml of toluene, and they were heated at 80° C. for 2 hours. The reaction mixture was then subjected to solid-liquid separation by filtration. The solid portion was transferred to 50 ml of toluene, and 32 ml of a toluene solution (Zr 0.04 mole/liter) of bis (cyclopentadienyl)zirconium dichloride was added. The mixture was heated at 80° C. for 1 hour. Again, the mixture was subjected to solid-liquid separation by filtration to give a solid catalyst. The zirconium content of the solid catalyst was 0.27% by weight. 0.1 milligram, calculated as zirconium atom, of the solid catalyst, 20 ml of a toluene solution (Al 0.49 mole/liter) of the aluminoxane synthesized in Example 19, and 20 ml of toluene were added to the solid catalyst, and the mixture was stirred at room temperature for 30 minutes. Toluene was then remove by an evaporator at room temperature. A gaseous mixture of ethylene and nitrogen (30 liters/hr and 45 liters/hr, respectively) was passed through the resulting catalyst component at room temperature for 30 minutes to give a solid catalyst component in which ethylene was polymerized in an amount of 0.30 g per gram of the catalyst.

Polymerization

Polymerization was carried out in the same way as in Example 22. The results are shown in Table 6.

Comparative Example 11

Example 27 was repeated except that triisobutyl aluminum was not used. The results are shown in Table 6.

TABLE 5

| | Transition metal compound (mmol/l) | Organoaluminum compound (C) Type | (mmol) | Total pressure (kg/cm²-G) | Comonomer Type | (ml) |
|---|---|---|---|---|---|---|
| Example 19 | 0.015 | (i-Bu)₃Al | 1 | 7 | 1-hexene | 100 |
| Example 20 | " | " | " | 6 | — | — |
| Example 21 | " | " | " | 8 | 1-hexene | 10 |
| Example 22 | " | " | " | " | — | — |
| Example 23 | " | " | 0.5 | 7 | 4-methyl-1-pentene | 100 |
| Example 24 | " | TMPAL* | 1 | " | 1-hexene | " |
| Example 25 | " | TEHAL** | " | " | " | " |
| Example 26 | " | isoprenyl aluminum | " | " | " | " |
| Example 27 | " | (i-Bu)₃Al | " | 8 | — | — |
| Comp. Example 10 | 0.015 | — | — | 6 | — | — |
| Comp. Example 11 | " | " | " | 8 | " | " |

| | Polymerization temperature (°C.) | Polymerization time (hr) | Amount yielded (g) | Activity (g-polymer/mmol-Zr) |
|---|---|---|---|---|
| Example 19 | 70 | 2 | 101.2 | 6750 |
| Example 20 | " | " | 53.7 | 3580 |
| Example 21 | " | " | 46.8 | 3120 |
| Example 22 | " | " | 17.8 | 1190 |
| Example 23 | 70 | 2 | 112.5 | 7500 |
| Example 24 | " | " | 94.1 | 6270 |
| Example 25 | " | " | 96.2 | 6410 |
| Example 26 | " | " | 60.6 | 4040 |
| Example 27 | 80 | 1 | 22.0 | 1470 |
| Comp. Example 10 | 70 | 2 | 12.2 | 810 |
| Comp. Example 11 | 80 | 1 | 5.6 | 370 |

*TMPAL; Tri(2-methylpentyl)aluminum
**TEHAL; Tri(2-ethylhexyl)aluminum

TABLE 6

| | MFR (g/10 min.) | Density (g/cm³) | Mw/Mn | Bulk density (g/cm³) | n-decane-soluble portion at room temperatures (wt %) |
|---|---|---|---|---|---|
| Example 19 | 0.16 | 0.916 | 2.98 | 0.33 | 0.31 |
| Example 20 | 0.03 | — | 2.79 | 0.40 | — |
| Example 21 | 1.45 | 0.925 | 3.03 | 0.31 | 0.10 |
| Example 22 | 0.19 | — | 2.88 | 0.36 | — |
| Example 23 | 0.25 | 0.920 | 3.10 | 0.34 | 0.25 |
| Example 24 | 0.13 | 0.915 | 2.93 | 0.33 | 0.29 |
| Example 25 | 0.10 | 0.914 | 3.08 | 0.35 | 0.27 |
| Example 26 | 0.28 | 0.918 | 3.01 | 0.34 | 0.24 |
| Example 27 | 0.11 | — | 3.00 | 0.38 | — |
| Comp. Example 10 | 0.04 | — | 2.70 | 0.41 | — |
| Comp. Example 11 | 0.14 | — | 3.24 | 0.34 | — |

Example 28

Preparation of aluminoxane

A 400 ml flask fully purged with nitrogen was charged with 37 g of $Al_2(SO_4)_3 \cdot 14H_2O$ and 125 ml of toluene, and cooled to 0° C. 500 millimoles of trimethyl aluminum diluted with 125 ml of toluene was added drop-wise. The mixture was heated to 40° C., and reacted at this temperature for 10 hours. After the reaction, the reaction mixture was subjected to solid-liquid separation by filtration, and toluene was removed from the filtrate to give 13 g of aluminoxane as a white solid. It had a molecular weight, determined by freezing point depression in benzene, of 930. It showed an m value of 14 in catalyst component [B].

Polymerization

A 1-liter glass autoclave fully purged with nitrogen was charged with 500 ml of toluene, and a gaseous mixture of ethylene and propylene (120 liters/hr, and 80 liters/hr, respectively) was passed through the autoclave and left to stand for 20° C. for 10 minutes. Thereafter, 0.5 millimole of triisobutyl aluminum was added. Five minutes later, 0.25 milligram-atom, calculated as aluminum atom, of aluminoxane and subsequently, $2.5 \times 10^{-3}$ millimole of bis(cyclopentadienyl)phenoxyzirconium monochloride were added, and the polymerization was started. A gaseous mixture of ethylene and propylene was continuously fed, and polymerized at 20° C. under atmospheric pressure for 1 hour. After the polymerization, a small amount of methanol was added to stop the polymerization. The polymer solution was added to a large excess of methanol to precipitate the polymer. The polymer precipitate was dried at 130° C. under reduced pressure for 12 hours. The polymer was yielded in an amount of 10.9 g, and had an MFR of 0.21 g/10 min., an ethylene content, determined by $^{13}$C-NMR, of 85.5 mole %, an $\overline{M}w/\overline{M}n$ of 2.35 and a B value of 1.11. The polymerization conditions are shown in Table 7.

Comparative Example 12

Example 28 was repeated except that triisobutyl aluminum was not used in the polymerization of Example 28. No polymer was obtained.

Examples 29-32

Polymerization was carried out under the conditions shown in Table 7 by the same procedure as in Example 28. The results are shown in Table 7.

Example 33

Preparation of catalyst component (A)

Fifty milliliters of a solution of bis(cyclopentadienyl) ethoxyzirconium monochloride (Zr 1.35 millimoles/liter) in toluene was introduced into a 200 ml glass flask fully purged with nitrogen. Furthermore, 34 ml of dimethylaluminum chloride (Al 14 millimoles/liter) was added. The mixture was reacted at 25° C. for 30 minutes to give a catalyst component (A).
Polymerization Example 28 was repeated except that the catalyst component (A) prepared as above was used instead of bis(cyclopentadienyl)phenoxyzirconium monochloride.

Comparative Example 13

Example 33 was repeated except that triisobutyl aluminum was not used in the polymerization of Example 33. Hardly any polymer was obtained.

Examples 34-40

Polymerization was carried out under the conditions indicated in Table 7 by the same operation as in Example 28. The results are shown in Table 7.

Example 41

Polymerization

A 2-liter stainless steel autoclave fully purged with nitrogen was charged with 250 ml of hexane and 750 ml of 4-methyl-1-pentene, and heated to 35° C. Thereafter, 0.25 millimole of triisobutyl aluminum, 0.5 milligram-atom, calculated as aluminum atom, of the aluminoxane synthesized in Example 1, and $1\times10^{-3}$ milligram-atom, as zirconium atom, of the catalyst component (A) synthesized in Example 6 were introduced. Subsequently, ethylene was introduced, and the polymerization was started. Ethylene was continuously fed so as to maintain the total pressure at 8 kg/cm$^2$-G, and the polymerization was carried out at 45° C. for 1 hour. The polymerization product was worked up as in Example 1 to give 30.5 g of a polymer having an MFR of 0.62 g/10 min., a density of 0.902 g/cm$^3$, an $\overline{M}w/\overline{M}n$ of 2.98 and a decane-soluble portion weight fraction at room temperature of 1.9% by weight.

Example 42

Example 41 was repeated except that in the polymerization of Example 41, 750 ml of 1-hexene was used instead of 4-methyl-1-pentene. There was obtained 28.5 g of a polymer having an MFR of 1.01 g/10 min., a density of 0,891 g/cm$^3$ and an $\overline{M}w/\overline{M}n$ of 2.79.

Comparative Example 14

Example 41 was repeated except that in the polymerization of Example 41, triisobutyl aluminum was not used. There was obtained 2.5 g of a polymer having an MFR of 1 94 g/10 min., a density of 0,908 g/cm$^3$, an $\overline{M}w/\overline{M}n$ of 2.95 and a decane-soluble portion weight fraction at room temperature of 1.1% by weight.

Example 43

A 1-liter continuous polymerization reactor was charged continuously with 500 ml/hr of toluene, 0.5 millimole/hr of tributyl aluminum, 0.5 milligram-atom/hr, calculated as aluminum atom, of the aluminoxane synthesized in Example 28, and $5\times10^{-3}$ milligram-atom/hr, calculated as zirconium atom, of the catalyst component (A) synthesized in Example 40. Simultaneously, 150 liters/hr of ethylene, 100 liters/hr of propylene, and 1.2 g/hr of ethylidene-2-norbornene (ENB) were continuously fed into the reactor. The polymerization was carried out at a temperature of 20° C. under atmospheric pressure with a residence time of 1 hour and a polymer concentration of 14 g/liter. The resulting polymerization product was worked up as in Example 28 to give an ethylene/propylene/ENB copolymer having an MFR of 2.04 g/10 min., an ethylene content, determined by $^{13}$C-NMR, of 85.8 mole %, an $\overline{M}w/\overline{M}n$ of 2.49 and an iodine value of 10.

TABLE 7

| | Organometallic compound (b) | | Transition metal compound | | Aluminoxane | Alkyl aluminum | |
|---|---|---|---|---|---|---|---|
| | Type | (b)/Zr[1] | Type | (mmol/l) | (mmol/l) | Type | (mmol/l) |
| Example 28 | — | — | Cp$_2$Zr(Oph)Cl | 5 × 10$^{-3}$ | 0.5 | (i-Bu)$_3$Al | 1.0 |
| Example 29 | — | — | Cp$_2$Zr(Sph)Cl | " | " | " | " |
| Example 30 | — | — | Cp$_2$Zr(Oph)Cl | " | " | TMPAL[3] | " |
| Example 31 | — | — | " | " | " | TEHAL[4] | " |
| Example 32 | — | — | Cp$_2$Zr(Sph)Cl | " | " | isoprenyl aluminum | " |
| Example 33 | (CH$_3$)$_2$AlCl | 2 | Cp$_2$Zr(OEt)Cl | " | " | (i-Bu)$_3$Al | " |
| Example 34 | " | " | " | " | 1 | " | " |
| Example 35 | " | " | " | " | 0.25 | " | " |
| Example 36 | " | " | " | 2 × 10$^{-2}$ | 0.5 | " | " |
| Example 37 | " | " | " | 5 × 10$^{-3}$ | " | TEHAL[4] | " |
| Example 38 | (CH$_3$)$_3$Al | " | " | " | " | (i-Bu)$_3$Al | " |
| Example 39 | Et$_2$AlCl | 3 | Cp$_2$Zr(OBu)Cl | " | " | " | " |
| Example 40 | (CH$_3$)$_2$AlCl | 2 | Cp$_2$Zr(OEt)Cl | " | " | isoprenyl aluminum | " |

TABLE 7-continued

| | | | | | | | |
|---|---|---|---|---|---|---|---|
| Comp. Example 12 | — | — | Cp$_2$Zr(Oph)Cl | 5 × 10$^{-3}$ | 0.5 | — | — |
| Comp. Example 13 | (CH$_3$)$_2$AlCl | 2 | Cp$_2$Zr(OEt)Cl | " | 0.05 | — | — |

| | Monomer 1 | | Monomer 2 | | Polymerization temperature | Polymerization time | Amount yielded | Activity (g-polymer/ |
|---|---|---|---|---|---|---|---|---|
| | Type | (l/hr) | Type | (l/hr) | (°C.) | (hr) | (g) | mmol-Zr) |
| Example 28 | ethylene | 120 | propylene | 80 | 20 | 1 | 10.9 | 4360 |
| Example 29 | " | " | " | " | " | 0.5 | 10.1 | 4040 |
| Example 30 | " | " | " | " | " | 1 | 9.5 | 3800 |
| Example 31 | " | " | " | " | " | " | 9.2 | 3680 |
| Example 32 | " | " | " | " | " | " | 8.8 | 3520 |
| Example 33 | " | " | " | " | " | " | 18.0 | 7200 |
| Example 34 | " | " | " | " | " | 0.5 | 21.5 | 8600 |
| Example 35 | " | " | " | " | 30 | 1 | 7.4 | 2960 |
| Example 36 | " | 30 | " | 160 | 40 | " | 5.6 | 560 |
| Example 37 | " | 120 | " | 80 | 20 | " | 18.3 | 7320 |
| Example 38 | " | " | " | " | " | " | 14.8 | 5920 |
| Example 39 | " | " | " | " | " | " | 16.9 | 6760 |
| Example 40 | " | " | " | " | " | " | 11.0 | 4400 |
| Comp. Example 12 | ethylene | 120 | propylene | 80 | 20 | 1 | 0 | — |
| Comp. Example 13 | " | " | " | " | " | " | trace | — |

| | MFR (g/10 min.) | Ethylene content (mol %) | Mw/Mn | B value | [η]$^{2)}$ (dl/g) |
|---|---|---|---|---|---|
| Example 28 | 0.21 | 85.5 | 2.35 | 1.11 | — |
| Example 29 | 0.42 | 85.0 | 2.29 | 1.12 | — |
| Example 30 | 0.19 | 83.9 | 2.30 | 1.12 | — |
| Example 31 | 0.18 | 83.0 | 2.42 | 1.13 | — |
| Example 32 | 1.54 | 86.2 | 2.45 | 1.10 | — |
| Example 33 | 0.33 | 83.9 | 2.34 | 1.12 | — |
| Example 34 | 0.62 | 83.2 | 2.05 | 1.13 | — |
| Example 35 | 0.25 | 85.8 | 2.25 | 1.10 | — |
| Example 36 | — | 60.7 | 2.01 | — | 0.22 |
| Example 37 | 0.28 | 81.2 | 2.16 | 1.18 | — |
| Example 38 | 0.67 | 86.0 | 2.33 | 1.10 | — |
| Example 39 | 0.40 | 82.9 | 2.29 | 1.13 | — |
| Example 40 | 0.37 | 84.4 | 2.30 | 1.12 | — |
| Comp. Example 12 | — | — | — | — | — |
| Comp. Example 13 | — | — | — | — | — |

Oph: Phenoxy group
Sph; Thiophenyl group
OEt; Ethoxy group
Obu; t-Butoxy group
$^{1)}$Mole ratio at the time of treatment
$^{2)}$Measured in decalin at 135° C.
$^{3)}$Tri(2-methylpentyl)aluminum
$^{4)}$Tri(2-ethylhexyl)aluminum

We claim:

1. A catalyst composition for copolymerizing ethylene and alpha-olefin having 3 to 20 carbon atoms, said catalyst composition comprising:

(A) a catalyst component containing as the transition metal compound a zirconium metallocene represented by the following formula (I)

$$R^{11}R^{12}R^{13}R^{14}Zr$$

wherein $R^{11}$ represents a cycloalkadienyl group, $R^{12}$ is selected from the group consisting of —OR$^a$, —SR$^b$ and —NR$^c$, $R^{13}$ represents a cycloalkyladienyl group, an aryl group, an aralkyl group, a halogen atom, or a hydrogen atom, $R^{14}$ represents an aryl group, an aralkyl group, a halogen atom or a hydrogen atom, each of $R^a$, $R^b$ and $R^c$ represents an alkyl group, a cycloalkyl group, an aryl group, an aralkyl group or an organic silyl group; and when —OR$^a$ is alkyloxy, said transition metal compound is pre-treated with dialkylaluminum halide or trialkylaluminum compound;

(B) an aluminoxane of formula (II)-1, formula (III)-1 or mixture thereof

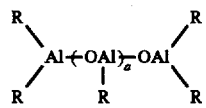 (II)-1

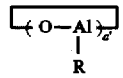 (III)-1 wherein R is a hydrocarbon group, a is a number of from 2 to 50, and a' is a number from 4 to 52; and (C) an organoaluminum compound having a branched alkyl group; wherein catalyst component (A), aluminoxane (B) and organoaluminum compound (C) are combined and the amount of zirconium metallocene is from 10$^{-8}$ to 10$^{-2}$ gram-atom/liter, as zirconium atom, in a polymerization system; and the amount of aluminoxane (B) is more than 0 but not more than 3 milligram-atom/liter, as aluminum atom, in the polymerization system.

2. A catalyst as set forth in claim 1 wherein the organoaluminum compound (C) is a tri(branched alkyl) aluminum compound.

3. The catalyst composition of claim 1, wherein said cycloalkadienyl group is selected from the group consisting of a cyclopentadienyl, a methylcyclopentadienyl, an ethylcyclopentadienyl, a dimethylcyclopentadienyl, an indenyl, and a tetrahydroindenyl group.

4. The catalyst composition of claim 1, wherein said aryl groups represented by $R^{13}$ and $R^{14}$ are selected from the group consisting of phenyl and tolyl groups.

5. The catalyst composition of claim 1, wherein the aralkyl groups represented by $R^{13}$ and $R^{14}$ are selected from the groups consisting of benzyl and neophile groups.

6. The catalyst composition of claim 1, wherein $R^a$, $R^b$ and $R^c$ each represent an alkyl group selected from the group consisting of methyl, ethyl, propyl, isopropyl, butyl, hexyl, octyl, 2-ethyl-hexyl, decyl, and oleyl groups.

7. The catalyst composition of claim 1 wherein $R^a$, $R^b$ and $R^c$ each represent a cycloalkyl group selected from the group consisting of cyclopentyl, cyclohexyl, cyclooctyl, and norbornyl groups.

8. The catalyst composition of claim 1, wherein $R^a$, $R^b$ and $R^c$ each represent an organic silyl group selected from the group consisting of trimethylsilyl, triethylsilyl, phenyldimethylsilyl, diphenylmethylsilyl and triphenylsilyl groups.

9. The catalyst composition of claim 1 wherein the proportion of the aluminum atoms of the aluminoxane component (B) based on the total amount of the aluminum atoms in the aluminoxane component (B) and in the organoaluminum compound (C) is from 20 to 80%.

10. The catalyst composition of claim 9 wherein the proportion of the aluminum atoms of the aluminoxane component (B) based on the total amount of the aluminum atoms in the aluminoxane component (B) and in the organoaluminum component (C) is from 30 to 70%.

11. The catalyst composition of claim 1 wherein $R^{12}$ is —$OR^a$.

12. The catalyst composition of claim 1 wherein $R^{12}$ is —$SR^b$.

13. The catalyst composition of claim 1 wherein $R^{12}$ is —$NR^c$.

14. The catalyst composition of claim 11 wherein $R^a$ is alkyl, cycloalkyl or aralkyl group.

15. The catalyst composition of claim 11 wherein $R^a$ is aryl group.

16. The catalyst composition of claim 11 wherein $R^a$ is organic silyl group.

17. The catalyst composition of claim 1 which is a non-supported catalyst composition.

18. The catalyst composition of claim 1 wherein the dialkyl aluminum halide or trialkyl aluminum used to pretreat the transitional metal compound when —$OR^a$ is alkoxy is selected from the group consisting of trimethylaluminum, triethylaluminum, tributylaluminum, dimethylaluminum chloride, diethylaluminum chloride and dimethyl aluminum bromide.

19. A catalyst composition exhibiting high activity for copolymerizing ethylene and an alpha-olefin having from 3 to 20 carbon atoms, said composition comprising (A) a zirconium metallocene compound of formula (I)

   (I)

wherein $R^{11}$ and $R^{13}$ each represent a cycloalkadienyl group; $R^{12}$ represents a member selected from the group consisting of —$OR^a$, —$SR^b$ and —$NCc$ and $R^{14}$ represents a halogen atom, and, $R^a$, $R^b$ and $R^c$ each represent an alkyl group, an aryl group, an aralkyl group or an organic silyl group;

(B) an aluminoxane of formula (II)-1 or formula (III)-1 or mixture thereof:

   (II)-1

   (III)-1 wherein R represents a hydrocarbon group; a is a number of from 2 to 50; and a' is a number of from 4 to 52; and (C) an organoaluminum compound having a branched alkyl group;

wherein the proportion of the aluminum atoms in the aluminoxane (B) to the total aluminum atoms in the aluminoxane (B) and organoaluminum compound (C) is from 20 to 80%; and the ratio of the total amount of aluminum atoms in the aluminoxane (A) and organoaluminum compound (B) to the zirconium metal atom, is from 50 to 5000.

20. The composition of claim 19 wherein in the zirconium metallocene of formula (I) $R^{12}$ represents phenoxy, thiophenyl, ethoxy or t-butoxy, and the organoaluminum compound as component (C) is selected from the group consisting of tri-isobutyl aluminum, tri(2-methylpentyl) aluminum, tri(2-ethylhexyl)-aluminum and isoprenyl aluminum.

21. The catalyst composition of claim 19 wherein the metallocene represented by formula (I) is selected from the group consisting of
bis(cyclopentadienyl)methoxyzirconium chloride,
bis(cyclopentadienyl)ethoxyzirconium chloride,
bis(cyclopentadienyl)butoxyzirconium chloride,
bis(cyclopentadienyl)2-ethylhexocyzirconium chloride,
bis(cyclopentadienyl)methylzirconium ethoxide,
bis(cyclopentadienyl)methylzirconium butoxide,
bis(cyclopentadienyl)ethylzirconium ethoxide,
bis(cyclopentadienyl)phenylzirconium ethoxide,
bis(cyclopentadienyl)benzylzirconium ethoxide,
bis(methylcyclopentadienyl)ethoxyzirconium chloride,
bis(indenyl)ethoxyzirconium chloride,
bis(cyclopentadienyl)phenoxyzirconium chloride,
bis(cyclopentadienyl)cyclohexoxyzirconium chloride,
bis(cyclopentadienyl)phenylmethoxyzirconium chloride,
bis(cyclopentadienyl)methylzirconium phenylmethoxide,
bis(cyclopentadienyl)trimethylsiloxyzirconium chloride,
bis(cyclopentadienyl)triphenylsiloxyzirconium chloride,
bis(cyclopentadienyl)thiophenylzirconium chloride,
bis(cyclopentadienyl)bis(dimethylamide)zirconium,
bis(cyclopentadienyl)diethylamidezirconium chloride,
ethylenebis(indenyl)ethoxyzirconium chloride, and
ethylenebis(4,5,6,7-tetrahydro-1-indenyl)ethoxyzirconium chloride.

22. The catalyst composition of claim 19 wherein the zirconium metallocene compound of formula (I) is bis(cyclopentadienyl)phenoxyzirconium chloride or bis(cyclopentadienyl)thiophenylzirconium chloride.

23. The catalyst composition of claim 19 wherein the zirconium metallocene compound of formula (I) is bis(cyclopentadienyl)ethoxyzirconium chloride or bis(cyclopentadienyl)butoxyzirconium chloride.

24. The catalyst composition of claim 19 which is a non-supported catalyst composition.

25. A catalyst composition effective for polymerizing olefins which is the product obtained by mixing within or without a polymerization reaction system and in any other a zirconium metallocene catalyst component (A), an aluminoxane component (B) and an organoaluminum compound component (C), wherein zirconium metallocene catalyst component (A) is a zirconium metallocene represented by formula (I)

$$R^{11}R^{12}R^{13}R^{14}Zr \qquad (I)$$

wherein $R^{11}$ represents a cycloalkadienyl group, $R^{12}$ is selected from the group consisting of —$OR^a$, —$SR^b$ and —$NR^c$, $R^{13}$ represents a cycloalkyladienyl group, an aryl group, an aralkyl group, a halogen atom, or a hydrogen atom, $R^{14}$ represents an aryl group, an aralkyl group, a halogen atom or a hydrogen atom, each of $R^a$, $R^b$ and $R^c$ represents an alkyl group, a cycloalkyl group, an aryl group, an aralkyl group or an organic silyl group; and when —$OR^a$ is alkyloxy, said transition metal compound is pre-treated with dialkylaluminum halide or trialkylaluminum;

aluminoxane component (B) is an aluminoxane of formula (II)-1 or formula (III)-1 or mixture thereof

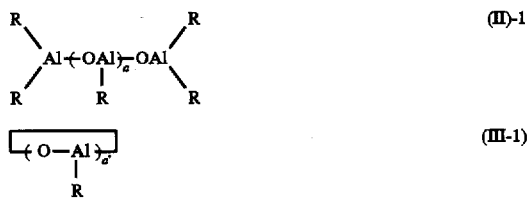

wherein R is a hydrocarbon group, a is a number of from 2 to 50; and a' is a number from 4 to 52; and organoaluminum compound component (C) is an organoaluminum compound having a branched alkyl group; and wherein the mixing ratio of components (A), (B) and (C) is such that the amount of zirconium metallocene is from $10^{-8}$ to $10^{-2}$ gram·atom/liter of polymerization reaction system, as zirconium atom, the amount of aluminum is more than 0 but not more than 3 milligram·atom/liter of polymerization reaction system, an aluminum atom; and the proportion of the aluminum atoms of the aluminoxane component (B) based on the total amount of the aluminum atoms in the aluminoxane component (B) and in the organoaluminum compound component (C) is from 20% to 80%.

26. The catalyst composition of claim 25 wherein the mixing ratio of the zirconium metallocene when —$OR^a$ is alkyloxy, with the dialkylaluminum halide or trialkyl aluminum, is from 0.5 to 50 as the ratio of millimoles of dialkylaluminum halide or trialkylaluminum to grams of zirconium metallocene.

27. The catalyst composition of claim 26 wherein the catalyst composition is a non-supported catalyst composition.

28. The catalyst composition of claim 25 wherein the catalyst composition is a non-supported catalyst composition.

* * * * *